United States Patent [19]

Horwitz

[11] 4,055,055
[45] Oct. 25, 1977

[54] THERMOSIPHONIC BOILER

[76] Inventor: Ludvig L. Horwitz, Apelvagen 25, S-182 75 Stocksund, Sweden

[21] Appl. No.: 666,334

[22] Filed: Mar. 12, 1976

[30] Foreign Application Priority Data

Apr. 1, 1975 Sweden .............................. 7503667

[51] Int. Cl.² ............................................ F25B 27/02
[52] U.S. Cl. .................................... 62/238; 237/2 B; 126/271; 126/400
[58] Field of Search .................... 122/33, 37; 126/271, 126/400; 62/238; 237/1 A, 2 B

[56] References Cited

U.S. PATENT DOCUMENTS

| 1,425,174 | 8/1922 | Cartter et al. | 126/271 |
| 2,969,637 | 1/1961 | Rowekamp | 126/271 |
| 3,977,601 | 8/1976 | Bearzi | 237/1 A |

Primary Examiner—Carroll B. Dority, Jr.
Attorney, Agent, or Firm—Young & Thompson

[57] ABSTRACT

A thermosiphonic boiler with two mutually communicating water containers, one above the other, said containers housing water volumes being thermically insulated from the surroundings of the boiler and from each other by heat insulation in the boiler walls and in an intermediate wall common to the containers and separating their water volumes. The lower container is incorporated in an energy supply circuit through which water from the lower portion of the container is caused by a pump to flow through a solar radiation trap heating the water passing therethrough, and back to the upper portion of the lower container. The upper container is connected to a circulation circuit through which water from the upper portion of the container is returned by means of a pump to its lower portion after having passed through radiators. In the water volume of the upper container there is provided a hot water supplier with heating means from which supplier hot water can be tapped off. The intermediate wall constitutes a pressure vessel preheating fresh water supplied to the hot water supplier, there being provided in the intermediate wall a central pipe stub extending through the wall, through which pipe stub, water from the upper portion of the lower container can flow by thermosiphonic action up into the upper container, there being provided at the circumference of the intermediate wall openings through which water from the lower portion of the upper container can flow down into the lower container.

6 Claims, 5 Drawing Figures

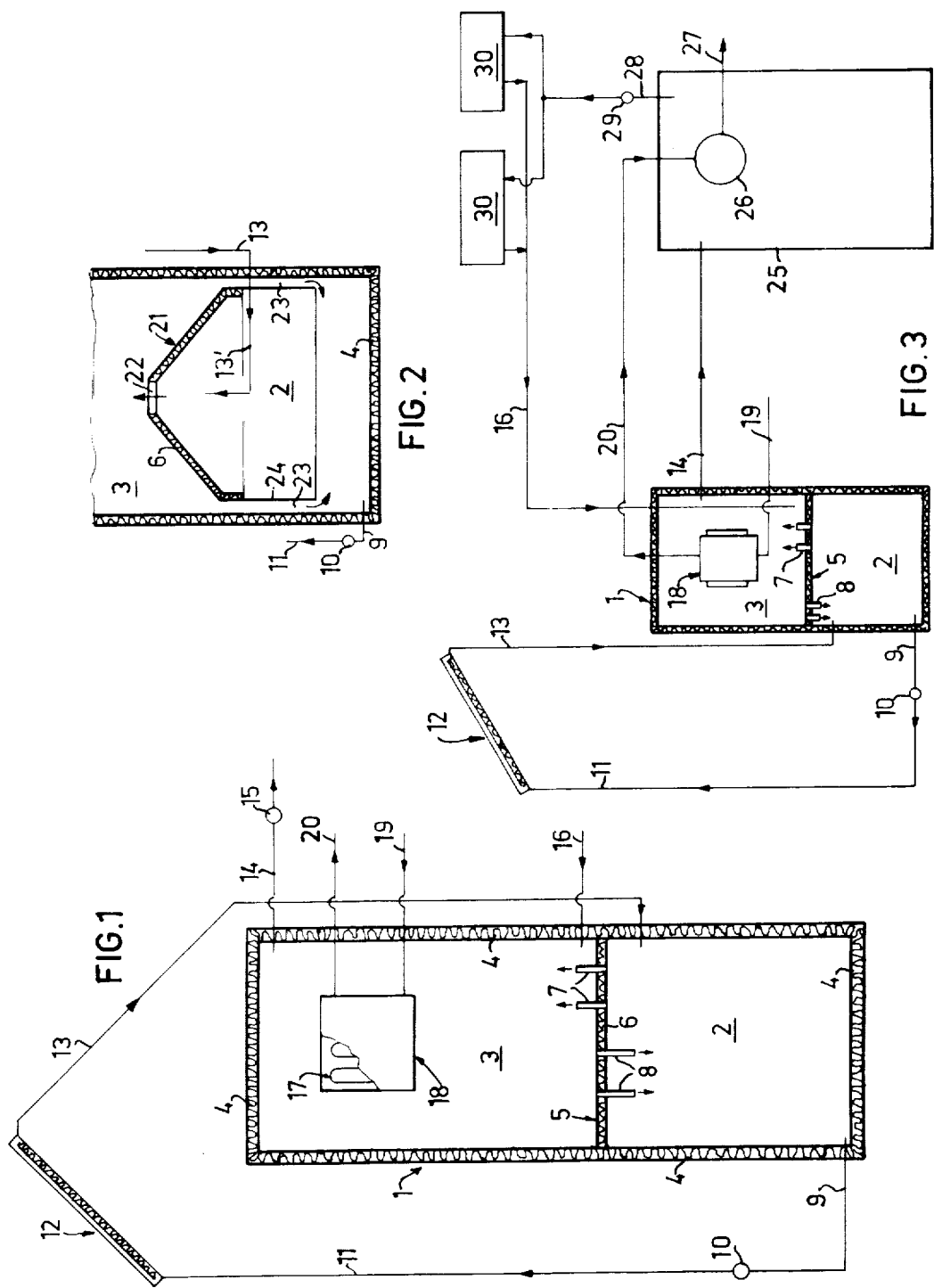

THERMOSIPHONIC BOILER

The present invention relates to a thermosiphonic boiler with two mutually communicating water containers, one situated above the other, said containers housing water volumes which are thermically insulated from the surroundings of the boiler by means of heat insulation in the walls of the boiler, and respectively from each other by means of a heat insulating layer in an intermediate wall structure, common to both containers, which separates their water volumes.

The invention primarily relates to providing a new and improved type of thermosiphonic boiler with which it will be possible to utilize in a rational manner such freely available sources of energy as for example sunshine, wind forces etc. partly for heating dwellings, office premises, industrial premises, baths etc., and partly for generating hot water for these dwellings or premises.

Systems produced up to now for utilizing radiation from the sun to generate hot water and heating and/or cooling of dwellings, for example, have been found to have considerable drawbacks, especially when the intention has been to supplement existing heating installations. The known systems have furthermore been found to be both expensive in manufacture and to keep in operation.

In a type of known installation which, inter alia, has come into use in Australia and Israel, heating of water by means of solar radiation in a thermosiphonic system with a water container of about 150–200 liters was utilized. In another known design which was intended to function satisfactorily in spite of considerable variations in solar radiation during cloudy and clear weather and the solar elevations dependent on seasonal variations, it was found that one had to have very large energy storage volumes of water and/or stone. The need of large water and/or stone volumes was found to cause large costs and considerable technical difficulties especially in the application to existing buildings.

The present invention has the primary object of eliminating difficulties and disadvantages recounted hereinbefore, and to considerably reduce the costs of manufacture, installation and operation of a thermosiphonic boiler. The thermosiphonic boiler according to the invention will enable use both in new buildings for which installation of the boiler has been arranged beforehand, and as a complement to existing heating installations in already completed buildings.

With a thermosiphonic boiler of the type set forth in the introduction, the above-mentioned object according to the invention can be satisfied by the lower container being incorporated in an energy supply circuit through which water from the lower portion of the container can be caused to flow, when needed with the aid of, e.g., thermostat controlled pumping means, through heat exchanger means arranged for heating up the water while utilizing energy from a freely available source of energy, e.g., solar radiation, so-called wind force etc., and then back again to the upper portion of the container, and that the upper container is connected to a circulation circuit through which water from the upper portion of this container is returned to its lower portion, when needed with the aid of pump means, via one or more heat dissipating means, there being arranged in the water volume of the upper container a hot water supplier supplied with water from a fresh water system and provided with special heating means, e.g., an electric element, hot water circuit, etc., from which supplier hot water can be tapped off, and that in the intermediate wall structure there are first through-flow means through which water from the upper part of the lower container can by thermosiphonic action or convection flow up into the upper container, and second through-flow means through which water from the lower portion of the upper container can flow down into the lower container.

Heating the water in the hot water supplier can naturally be achieved in a manner known per se by burning oil or gas. The liquid exchange between the lower container and the upper container takes place by means of so-called thermosiphonic action when the temperature of the water in the upper part of the lower container is higher than the temperature of the water in the lower part of the upper container. When the freely available source of energy which is used is solar radiation, the volume of the lower container should be adjusted to the surface and temperature of the solar radiation trap.

The through-flow means in the intermediate wall structure, through which means the liquid exchange can take place between the lower container and the upper container, can be made in a plurality of different ways.

In a preferred embodiment, the through-flow means can for example comprise a plurality of straight pipe stubs which at their outlet ends extend a distance into the respective container from the intermediate wall structure.

To obtain good function it is necessary in certain cases for the intermediate wall structure to have the shape of a funnel or bell with its narrower end upwards, the first through-flow means thereby comprising at least one opening in the central portion of said narrower end and the second through-flow means having the form of openings or gaps at the periphery of the intermediate wall structure.

So that it shall be possible to utilize energy even at a relatively low temperature, at the same time as it is possible to select arbitrary radiator temperatures, the thermically insulated intermediate wall structure may be made as a container arranged in series with the hot water supplier, and intended for pre-heating of the cold fresh water which is used for the hot water supply. The energy used for pre-heating is hereby taken from the heat content in the lower container. The pre-heating container thus forming a part of the intermediate wall structure can be given such a design that the function of the thermosiphonic boiler will be otherwise unaltered.

The intermediate wall structure is hereby made as a pressure vessel arranged for pre-heating of the fresh water to the hot water supplier, there being an inlet pipe to the pressure vessel for fresh water, and a supply pipe for preheated fresh water extending from the vessel to the inlet of the hot water supplier.

For further increasing the ability of the thermosiphonic boiler to take up and utilize at low temperature energy from a freely available source of energy such as solar radiation, and to increase the energy storage capacity of the installation while retaining outside dimensions, the boiler can suitably be supplemented with one or more heat pumps.

The boiler is provided hereby, according to the invention, with at least one closed heat pump circuit wherein are incorporated an evaporator, a compressor, a condenser and a reduction valve, and that the evaporator consists of a first pipe coil arranged in the lower container, the outlet portion of the coil being in communication with the compressor, the pressure side of which is connected to a second pipe coil arranged in the upper container and constituting the condenser, the condenser having an outlet portion which is in communication with the inlet portion of the evaporator via the reduction valve.

The invention will now be exemplified and more closely described while referring to some different embodiments shown on the drawing.

On the appended drawing,

FIG. 1 shows schematically and partly in section how a thermosiphonic boiler according to the invention can be coupled into a system with a solar radiation trap;

FIG. 2 shows schematically and in section how the lower portion of a thermosiphonic boiler according to the invention can appear with another intermediate wall structure than the one shown in FIG. 1;

FIG. 3 shows very schematically how a thermosiphonic boiler according to the invention and connected to a solar radiation trap can be coupled into an existing heating installation for a building;

Figure 4:
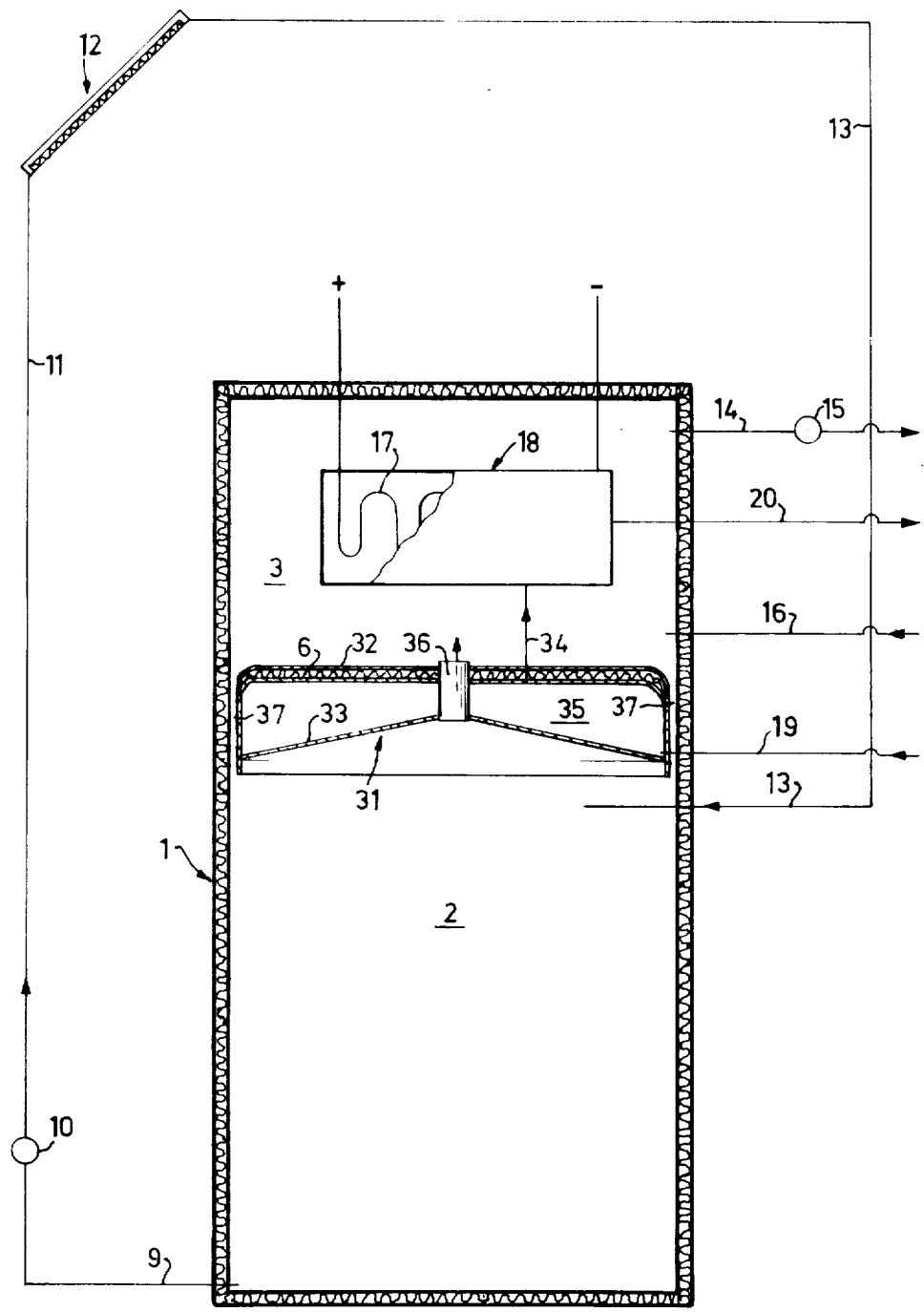
Figure 5:
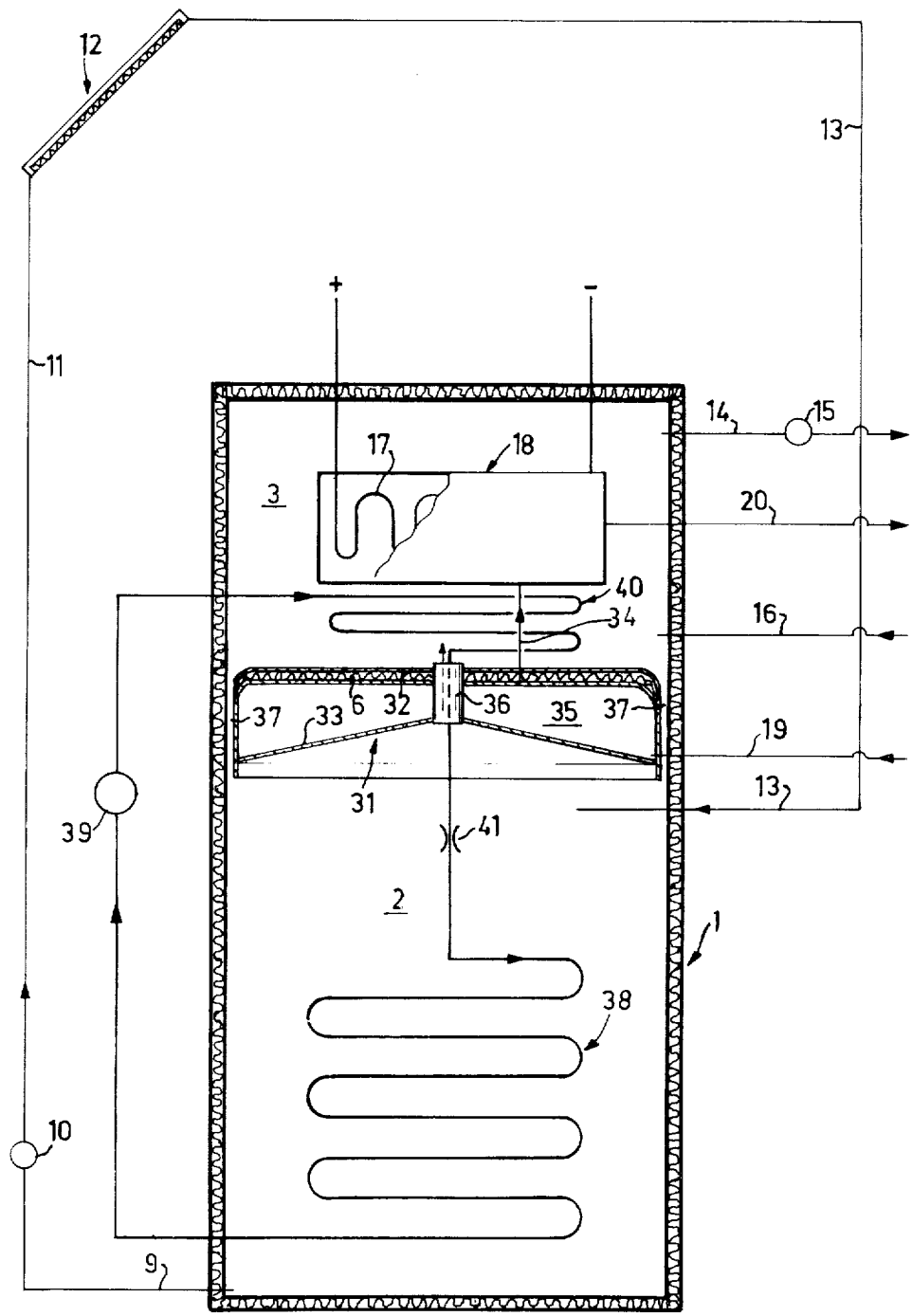

FIG. 4 shows in principal the same way as FIG. 1 how a thermosiphonic boiler according to the invention can be made when the intermediate wall structure forms the pre-heating vessel for water which is supplied to the hot water supplier; and FIG. 5 shows finally an embodiment partially in agreement with that shown in FIG. 4, although with the difference that the boiler has been supplemented by a heat pump.

In FIG. 1 a thermosiphonic boiler according to the invention is generally designated 1. In the boiler there are two mutually communicating water containers of which the lower is designated 2 and the upper 3. The water volumes in the containers 2 and 3 are thermically insulated from the surroundings of the boiler 1 by heat insulation 4 in the walls of the boiler. The water volumes of containers 2 and 3 are separated by an intermediate wall structure 5 common to both containers. There is a suitable heat insulation 6 in the intermediate wall structure as well. To enable liquid exchange between the containers 2 and 3 there is a first array or pipe stubs 7 in the intermediate wall structure 5 enabling water flow from the container 2 to the container 3 and a second array of pipe stubs 8 enabling water flow from the container 3 to the container 2. Both arrays of pipe stubs extend generally at right angles from the respective side of the intermediate wall structure and their outlet ends reach a distance into the respective container.

The lower container designated 2 in the figure is incorporated in an energy supply circuit which in the direction of water flow comprises a pipe 9 outgoing from the lower portion of the container, a circulation pump 10 (which may be thermostat controlled), a pipe 11, a heat exchange means in the shape of a solar radiation trap 12 and a return pipe 13 which opens out into the upper portion of the lower container 2. The water taken via the pipe 9 from the lower portion of the container 2 is heated by the solar radiation acting on the trap 12. This trap can, for example, be arranged on the roof of the house or building in which the thermosiphonic boiler is placed.

The upper container 3 in its turn is connected to a circulation circuit through which water from the upper portion of the container via a pipe 14 and with the assistance of pump 15 is transported to one or more radiators (not shown) in the building in question. After having passed through the radiators, the water is returned via the pipe 16 to the lower portion of the container 3.

In the water volume of the container 3 there is further arranged a hot water supplier 18 provided with a heating means, e.g., an electric battery 17. The hot water supplier is supplied with cold fresh water via the pipe 19, and heated water is taken from the hot water supplier via the pipe 20.

The water circulating through the circuit 9, 10, 12, 13 is heated as stated above in the solar radiation trap 12, which causes a successive increase in the temperature of the water in the upper portion of the container 2. When this temperature has become higher than the water temperature in the lower part of the container 3, there is a liquid exchange between the containers 2 and 3 via the pipe stubs 7 and 8. This liquid exchange takes place by so-called thermosiphonic action or convection. When solar radiation is the utilized source of energy it can be suitable for the solar radiation trap 12 to be provided with a thermostat controlling the starting and stopping of the pump 10. It is hereby possible to adjust the system so that when the temperature of the trap 12 is lower than the water temperature prevailing at the bottom of the container 2 the pump 10 is stopped and the trap 12 is automatically emptied of water, whereby freezing is avoided during cold weather. The water temperature in the container 2 will naturally be dependent on such parameters as the effective surface of the trap 12 and the temperature generated by solar radiation in the trap. With a thermosiphonic boiler according to the invention coupled into a system according to FIG. 1, it will be possible during the greater part of a year, thanks to the thermosiphonic action of the radiator water in the boiler, to obtain effective heating of the water intended for heating. The water volume in the container 2 only needs to be modest, and the heat losses will be low. By the utilization of such freely available energy sources as solar radiation, wind force or the like, it will thus be possible with a thermosiphonic boiler according to the invention to achieve considerable savings in oil, electrial energy, gas or the like being used for providing a certain portion of the water heating. The closed systems, i.e., on the one hand the energy supply circuit with the container 2 and the solar radiation trap 12, and on the other hand the radiator system with the container 3, enable use of other materials than copper which means the feasibility of considerably more economical installations than what has been achieved up to now.

In FIG. 2 a portion of a thermosiphonic boiler is shown, which mainly differs from the one shown in FIG. 1 in the design of the wall structure separating the containers 2 and 3. In FIG. 2 the same designations as in FIG. 1 have been used to denote such portions which are direct counterparts of the embodiment according to FIG. 1. As may be seen from FIG. 2 the wall structure in this case has the shape of a funnel or bell 21 with its narrower end upwards. The through-flow means correspondng to the pipe stubs 7 in FIG. 1 have their counterpart here in the centrally situated opening 22 at the "top" of the bell. The bell-shaped wall structure is provided with heat insulation 6, similarly to the wall structure 5 in FIG. 1. The pipe stubs 8 according to the embodiment in FIG. 1 find their counterpart in the wall structure according to FIG. 2 in the ducts 23 at the periphery of the structure 21. These ducts can have the form of passages or gaps evenly distributed around the periphery. As may be seen from the Figure the wall structure 21 is at its periphery provided with a downwardly directed sheet cowling 24. It should be noted that, apart from the different design of the intermediate wall structure according to FIG. 2, the return pipe 13 in this case has a special extension 13' so that the heated water coming from the solar radiation trap or its equivalent will be supplied to the container in the area under the opening 22.

The invention will now be described when it is used as a complement to an existing heating installation. FIG. 3 is now referred to, which schematically shows a system suitable thereto. The parts of the system according to FIG. 3 having direct correspondence with FIG. 1 have been given the same designations as in the latter figure.

The existing installation consists in this case of a conventional boiler generally denoted by 25 and having a hot water supplier 26. The hot water is taken from the conventional boiler 25 via the pipe 27. Heated radiator water is taken out via the pipe 28 with the help of the pump 29 from the conventional boiler 25 and is distributed thereafter to radiators 30. When the radiator water has passed through the radiators it is returned via the pipes 16 and 14 to the conventional boiler 25.

The additional heat obtained in the thermosiphonic boiler 1 will in this case reduce oil consumption in the existing conventional boiler 25 to a great degree, and also enable the conventional boiler 25 to be closed for long periods yearly. The advantages of the shown arrangement according to FIG. 3 should be obvious, taking into account that an existing installation can be supplemented in this way.

FIG. 4 is now referred to, the figure showing an alternative embodiment of the thermosiphonic boiler 1 according to the invention. As may be seen, the thermosiphonic boiler is coupled in substantially the same way as shown in FIG. 1. The portions of the system and the thermosiphonic boiler having direct correspondence with FIG. 1 have been given the same designations in FIG. 4. The thermosiphonic boiler according to FIG. 4 is distinguished mainly from the one shown in FIG. 1 by the special design of the intermediate wall structure which is designated 31 in FIG. 4. The structure 31 in this case has been designed as a pressure vessel intended for pre-heating the fresh water which via the pipe 19 is conducted to the hot water supplier 18. Only the upper wall 32 of the wall structure 31 is provided with an insulation 6 in this case. The lower upwardly conical bottom wall 33 of the vessel 31 has no such insulation. From the top of the vessel 31 the supply pipe 34 leads the thus heated fresh water to the hot water supplier 18. The intermediate wall structure 31 designed as a vessel, as stated, does not have any insulation in its lower wall 33, and therefore heat transfer can take place from the water in the container 2 to the water volume 35 in the invermediate wall structure 31 shaped as a vessel. Water flow from the container 2 to the container 3 takes place, in the embodiment according to FIG. 4, through the central pipe stub 36, while return flow of water from the container 3 to the container 2 takes place via the passage 37 around the periphery of the wall structure 31.

The heat insulations 4 and 6 used in the outer walls of the thermosiphonic boiler and in the respective intermediate wall structure can be carried out in many different ways, in certain cases a honeycomb-like structure can be suitable at least in the intermediate wall structure.

The embodiment shown in FIG. 5 is distinguished from the embodiment according to FIG. 4 in as far as the boiler 1 according to FIG. 5 is provided with a so-called heat pump circuit, which in the circulation direction of its heat carrying medium comprises an evaporator 38 placed in the lower container 2, a compressor 39 situated outside the boiler, a condenser 40 arranged in the upper container 3, and a restriction situated in the boiler 1 in the shape of a reduction valve 41. The said components are coupled together to a circuit with the help of pipes, and both the evaporator 38 and the condenser 40 are formed as pipe coils. As heat carrying medium in the circuit is suitably used an easily vapourizable liquid, e.g., ammonia or a flourine compound such as freon.

The heat pump circuit is suitably so dimensioned that the temperature of the evaporator 38 is sufficiently low for the formation of ice within at least a portion of the water volume in the container 2. This ice formation will increase when no outside energy is supplied via the solar radiation trap 12, but will lessen when sufficient energy is supplied via the solar radiation trap. To melt the ice which has been formed, a comparatively low temperature of the water in the return pipe 13 is required, and simultaneously the water temperature will be such that the liquid which via the pipe 11 is supplied to the solar radiation trap 12 either completely or partially consists of melted water which has the favorable effect that the solar radiation trap is given a lower temperature. Hereby greater heat absorption ability is achieved, and lower heat losses to the surroundings are obtained.

The temperature of the condenser 40 is suitably chosen so that effective cooling of the condenser is achieved at the water temperature in question in the appropriate portion of the container 3.

The advantages which are attained by the thermosiphonic boiler being provided with a heat pump circuit corresponding to the one shown in FIG. 5 can be summarized thus: the low temperature energy is utilized more effectively; the energy storage capacity is increased considerably, since the melting heat of the ice can be utilized; the temperature in the solar radiation trap (or its counterpart) can be kept lower, which results in higher energy gain, i.e., higher efficiency of the installation.

The embodiments described above and shown on the drawing figures are only schematical, due to the principle nature of the invention, and are in no way to be regarded as signifying any limitation of the scope of the invention, which instead is defined in the following patent claims. Within the scope of these patent claims many different embodiments and alternative design solutions are conceivable without departing from the inventive idea.

What I claim is:

1. A thermosiphonic boiler with two mutually communicating water containers (2,3), one (3) situated above the other (2), said containers housing water volumes which are thermically insulated from the surroundings of the boiler by means of heat insulation (4) in the walls of the boiler and respectively from each other by means of a heat insulating layer (6) in an intermediate wall structure (5;21;31), common to both containers, which separates their water volumes, characterized in that the lower container (2) is incorporated in an energy supply circuit (9,11,12,13), through which water from the lower portion of the container can be caused to flow through heat exchanger means (12) arranged for heating up the water utilizing energy from a freely available source of energy and then back again to the upper portion of the container (2), and that the upper container (3) is connected to a circulation circuit through which water from the upper portion of this container is returned to its lower portion, when needed with the aid of pump means (15), via one or more heat dissipating means, there being arranged in the water volume of the upper container (3) a hot water supplier (18) supplied with water from a fresh water system (19) and provided with special heating means (17) from which supplier hot water can be tapped off, and that in the intermediate wall structure (5;21;31) there are first through-flow means (7;22;36) through which water from the upper portion of the lower container (2) can by thermosiphonic action or convection flow up into the upper container (3) and second through-flow means (8;23;37) through which water from the lower portion of the upper container (3) can flow down into the lower container (2).

2. A thermosiphonic boiler as claimed in claim 1, characterized in that the through-flow means comprises a plurality of straight pipe stubs (7,8) extending with their outlet ends from the intermediate wall structure (5) a distance into the respective container.

3. A thermosiphonic boiler as claimed in claim 1 characterized in that the intermediate wall structure has the shape of a bell (21) or funnel with its narrower end facing upwards, the first through-flow means thereby comprising at least one opening (22) in the central portion of said narrower end, and the second through-flow means comprising openings or gaps (23) at the periphery of the intermediate wall structure (21).

4. A thermosiphonic boiler as claimed in claim 1 characterized in that the intermediate wall structure is made as a pressure vessel (31) adapted for preheating of the fresh water to the hot water supplier (18), and to which vessel an inlet pipe (19) for fresh water is connected and from which a supply pipe (34) for fresh water extends to the inlet connection of the hot water supplier.

5. A thermosiphonic boiler as claimed in claim 1, characterized in that the boiler (1) is provided with at least one closed heat pump circuit wherein are incorporated an evaporator (38), a compressor (39), a condenser (40) and a reduction valve (41) and that the evaporator (38) consists of a first pipe coil arranged in the lower container (2), the outlet portion of the coil being in communication with the compressor (39), the pressure side of which is connected with a second pipe coil arranged in the upper container (3) and constituting the condenser (40) said second pipe coil having an outlet portion in communication with the inlet portion of the evaporator (38) via the reduction valve (41).

6. A thermosiphonic boiler as claimed in claim 1, and thermostat controlled pumping means (10) to cause said water from said lower portion of said container to flow through said heat exchanger means.

* * * * *